United States Patent
Boatright et al.

(10) Patent No.: US 7,197,670 B2
(45) Date of Patent: Mar. 27, 2007

(54) METHODS AND APPARATUSES FOR REDUCING INFANT MORTALITY IN SEMICONDUCTOR DEVICES UTILIZING STATIC RANDOM ACCESS MEMORY (SRAM)

(75) Inventors: Bryan D. Boatright, Austin, TX (US);
Ben J. Eapen, Portland, OR (US); C. Glenn Shirley, Portland, OR (US);
Carl Scafidi, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 546 days.

(21) Appl. No.: 10/750,562

(22) Filed: Dec. 31, 2003

(65) Prior Publication Data

US 2005/0160326 A1    Jul. 21, 2005

(51) Int. Cl.
*G06F 11/00* (2006.01)
(52) U.S. Cl. ........................................ 714/42
(58) Field of Classification Search ............. 714/42; 711/144, 145
See application file for complete search history.

(56) References Cited

U.S. PATENT DOCUMENTS

| | | | | |
|---|---|---|---|---|
| 5,615,335 A | * | 3/1997 | Onffroy et al. | 714/30 |
| 5,943,693 A | * | 8/1999 | Barth | 711/220 |
| 6,006,311 A | * | 12/1999 | Arimilli et al. | 711/133 |
| 6,185,676 B1 | | 2/2001 | Poplingher et al. | |
| 6,321,353 B2 | * | 11/2001 | Debenham | 714/724 |
| 6,922,798 B2 | * | 7/2005 | Nemani et al. | 714/710 |
| 2002/0199067 A1 | | 12/2002 | Patel et al. | |
| 2003/0145257 A1 | | 7/2003 | Fields, Jr. et al. | |
| 2003/0225961 A1 | * | 12/2003 | Chow et al. | 711/103 |
| 2004/0019753 A1 | | 1/2004 | Boatright et al. | |
| 2005/0081114 A1 | * | 4/2005 | Ackaret et al. | 714/42 |

\* cited by examiner

*Primary Examiner*—Michael C. Maskulinski
(74) *Attorney, Agent, or Firm*—Schwabe, Williamson & Wyatt, P.C.

(57) ABSTRACT

In accordance with various embodiments of the present invention, a cache-equipped semi-conductor device is provided with enhanced error detection logic to detect a first location-independent error within an area of the cache memory and prevent further use of the area if the error is determined to be the second consecutive error associated with a common area.

17 Claims, 9 Drawing Sheets

METHODS AND APPARATUSES FOR REDUCING INFANT MORTALITY IN SEMICONDUCTOR DEVICES UTILIZING STATIC RANDOM ACCESS MEMORY (SRAM)

BACKGROUND OF THE INVENTION

1. Field of the Invention

The present invention relates generally to electronic circuits, and more particularly to methods and apparatuses for reducing burn in.

2. Background Information

Infant mortality is a term used to describe device failures that occur within the first year of usage. Infant mortality is most often caused by latent manufacturing defects (hereinafter referred to as "hard defects") that escape detection during factory tests and become permanently active during use of the device typically rendering the device as non-functional.

Currently, infant mortality in devices is controlled through a pre-shipment process of burn in. During the burn-in process, devices are operated at artificially elevated voltages and temperatures for a period of time so as to activate hard defects prior to device shipment that would otherwise affect customers early in the life of the device.

As transistor dimensions and threshold voltages are scaled down for performance, burn in power and consequently burn in hardware costs increase. This remains an issue as manufacturers struggle to meet market expectations of infant mortality rates while maintaining reasonable manufacturing costs.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

In accordance with various embodiments of the present invention, a cache-equipped semi-conductor device is provided with enhanced error detection logic to facilitate infant mortality control yielding reduced device burn in time (and cost) accompanied by only a negligible increase in die area. This may be contrasted to prior art cache fault tolerance methods that attempt to detect multiple errors over the full scope of the entire cache (e.g. on a per set basis). Such methods require large amounts of redundant memory cells and circuits, resulting in large increases in die area.

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Various operations will be described as multiple discrete steps performed in turn in a manner that is helpful for understanding the present invention. However, the order of description should not be construed as to imply that these operations are necessarily performed in the order they are presented, or are even order dependent. Furthermore, repeated usage of the phrase "in one embodiment" does not necessarily refer to the same embodiment, although it may. Lastly, the terms "comprising", "including", "having", and the like, as used in the present application, are intended to be synonymous.

Figure 1:
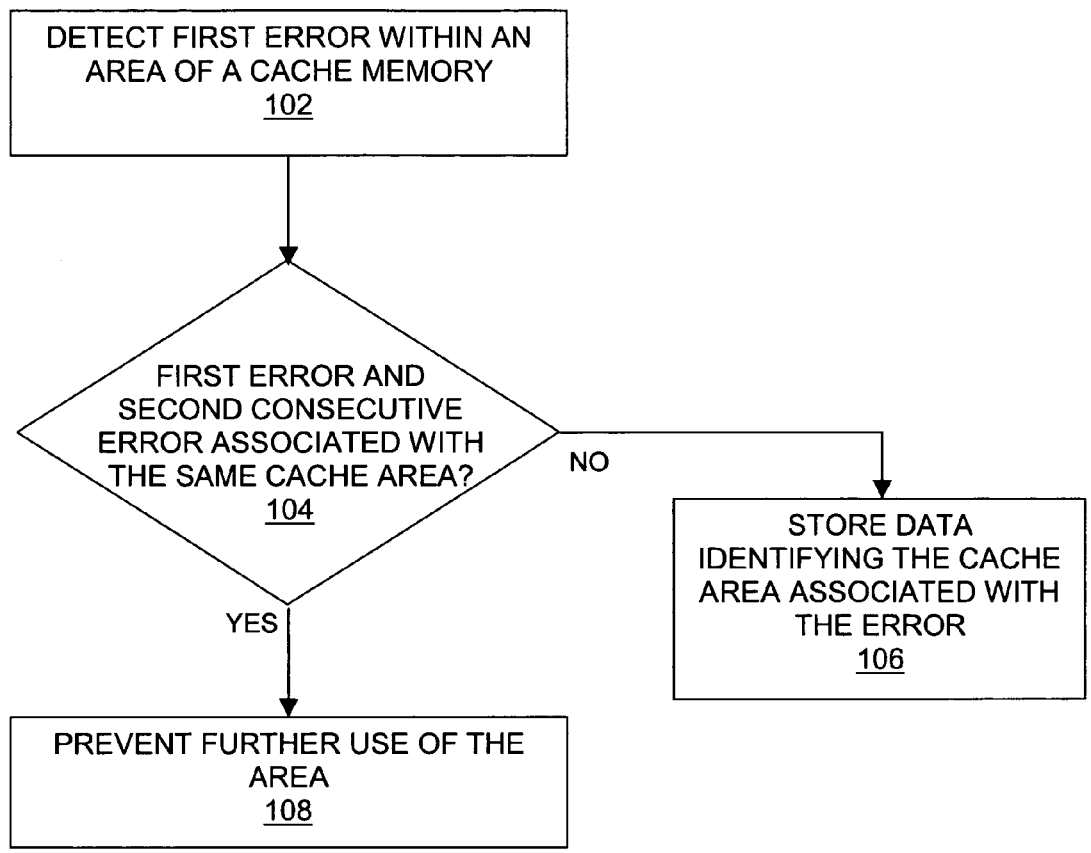
FIG. 1 is a flow diagram illustrating an overview of the present invention in accordance with one embodiment.

FIG. 1 is a flow diagram illustrating an overview of the present invention in accordance with one embodiment. In the illustrated embodiment, a cache error is detected within an area of a cache memory at block 102. In one embodiment, detection of the cache error is location-independent in that only a single error need be detected anywhere within the cache memory. In one embodiment, the error may be detected at run-time via error checking and correcting (ECC) logic. A determination is then made at block 104 as to whether the detected error represents a second consecutive error associated with the same area of the cache memory. If not, data identifying the cache area (such as, but not limited to a cacheline) affected by the error is stored at block 106 for use in detection of a subsequent error. However, if the detected error represents a second consecutive error associated with the same area of the cache memory, further use of the identified area is prevented at block 108.

In one embodiment, once a cache error has been identified, a cacheline affected by the error may be disabled by a cache management system. For example, a LRU score or MESI state associated with the affected cacheline may be dynamically modified to inhibit further access of the disabled cacheline by e.g. a processor. In one embodiment, a value stored in an LRU register may be modified such that the affected cacheline is less likely to be further accessed by a processor than at least one other cacheline within the cache memory. In one embodiment, a value may be stored in an LRU register associated with the affected cacheline to indicate that the cacheline was most recently used thereby decreasing the probability that the affected cacheline will be accessed further. In another embodiment, a MESI protocol associated with the cache memory may be expanded to include a "disable" state that is assignable to the cacheline.

Using such an expanded disable state may eliminate the probability that a processor will further access the affected cacheline.

In an alternative embodiment, rather than cache errors being detected at run-time, errors may be detected at startup via programmable built-in self test (PBIST) logic. In such an embodiment, further use of the affected area may be prevented without determining whether the error is a second consecutive error associated with the same area of the cache.

Figure 2:
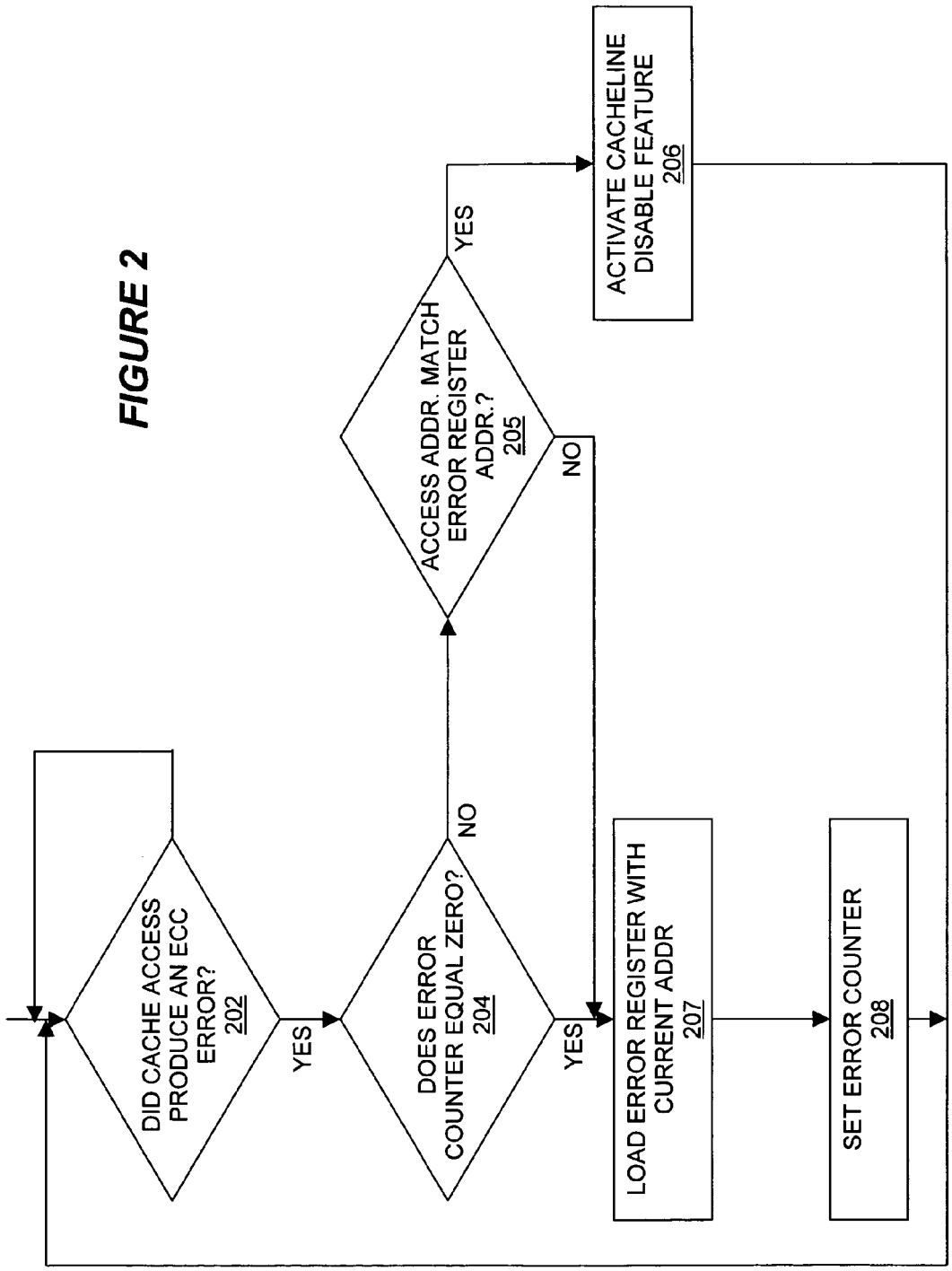
FIG. 2 is a flow diagram illustrating a process for detecting hard errors through recurrent ECC events in accordance with one embodiment of the present invention.

FIG. 2 is a flow diagram illustrating a process for detecting hard errors through recurrent ECC events in accordance with one embodiment of the present invention. In the illustrated embodiment, the process begins at block 202 with a cache access (e.g. by a processor) resulting in an ECC error. Once an error has been detected, an attempt is made to determine whether the error is a hard error (e.g. due to a latent manufacturing defect) or a soft error such as a single event upset (e.g. due to an alpha particle). In FIG. 2, a determination is made at block 204 as to whether an error counter is equal to zero. In one embodiment, the error counter is implemented as a state machine. If the error counter is equal to zero, an error register may be loaded with the current operation address at block 207, and the error counter may be incremented or otherwise set to indicate an ECC error at block 208. Thereafter, the process returns to block 202 where it may wait for additional cache accesses to produce a subsequent ECC error. Upon the occurrence of a subsequent cache error, a determination may again be made at block 204 as to whether the error counter is equal to zero. If the error counter is not equal to zero, thus indicating a previous detection of an ECC error, a further determination may be made at block 205 as to whether the current operation address associated with the cache access matches an address stored in the error register. If not, the error register may be loaded with the current operation address and block 207. However, if the current operation address associated with the cache access matches an address stored in the error register, a cacheline disable function may instead be activated at block 206.

Figure 3:
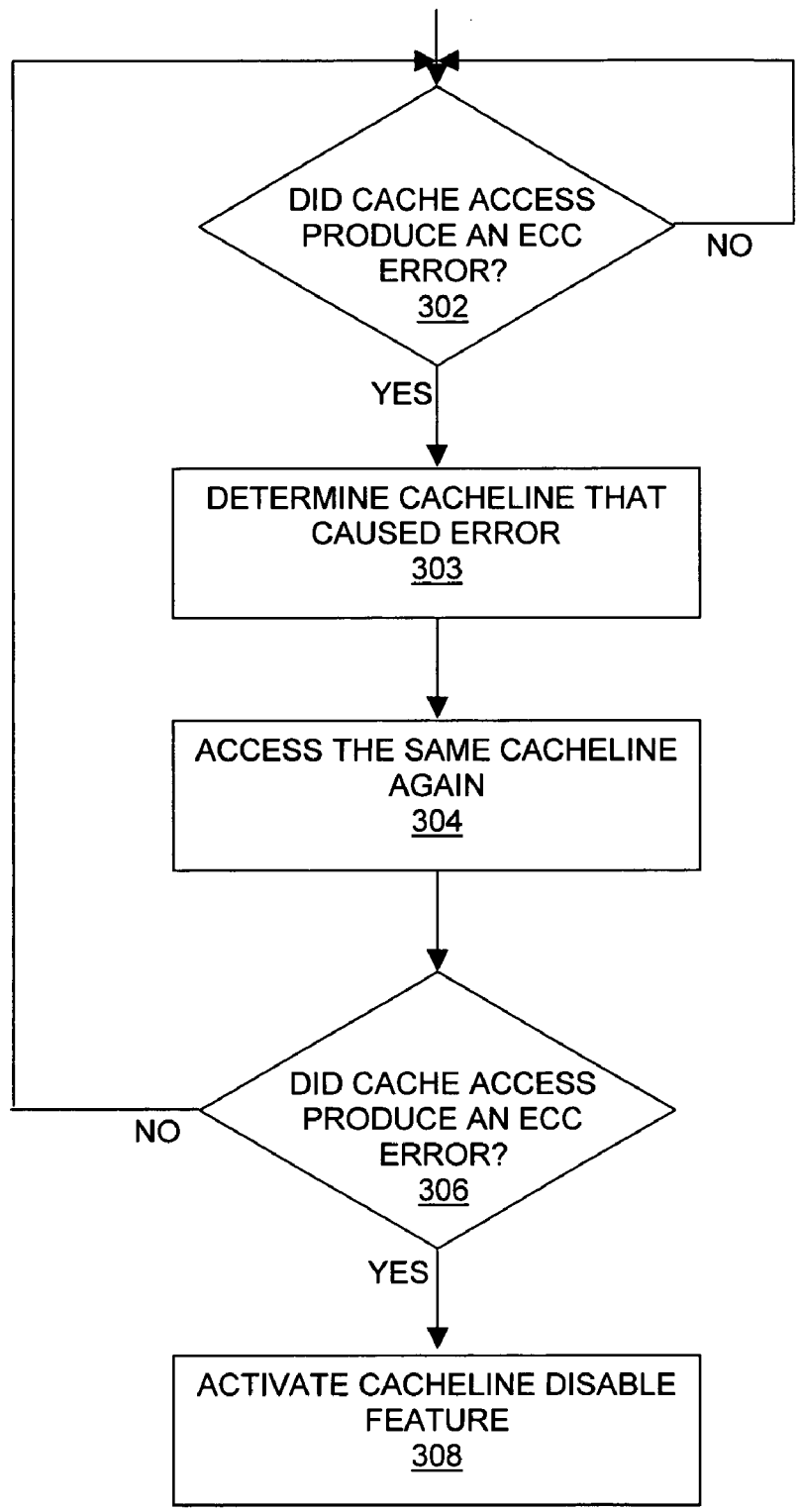
FIG. 3 is a flow diagram illustrating a process for detecting hard errors through forced ECC events in accordance with another embodiment of the present invention.

FIG. 3 is a flow diagram illustrating a process for detecting hard errors through forced ECC events in accordance with another embodiment of the present invention. In the illustrated embodiment, the process begins at block 302, where a determination may be made as to whether a cache access produced an ECC error. Upon a cache access producing an ECC error, the cacheline that caused the error may be determined at block 303. At block 304, the same cacheline that caused the error may be accessed a second consecutive time to proactively determine whether the error was a hard error or a soft error. A determination as to whether the second consecutive cache access also produced an ECC error may further be made at block 306. If the second consecutive cache access did not produce an ECC error, the process may return to block 302 where the process waits until another cache access produces an ECC error. However, if the second consecutive cache access did also produce an ECC error at block 306, the cacheline affected by the error may be disabled at block 308. In one embodiment, a cache management system such as a LRU algorithm or MESI protocol associated with the cache may be modified so as to decrease or eliminate the chance of the affected cacheline being accessed again.

Although the process depicted in FIG. 3 may decrease the amount of time it takes to detect a hard error as compared to the process depicted in FIG. 2, a system equipped to implement the process of FIG. 3 may require additional logic/circuitry and corresponding die area beyond that required by the process of FIG. 2.

Figure 4:
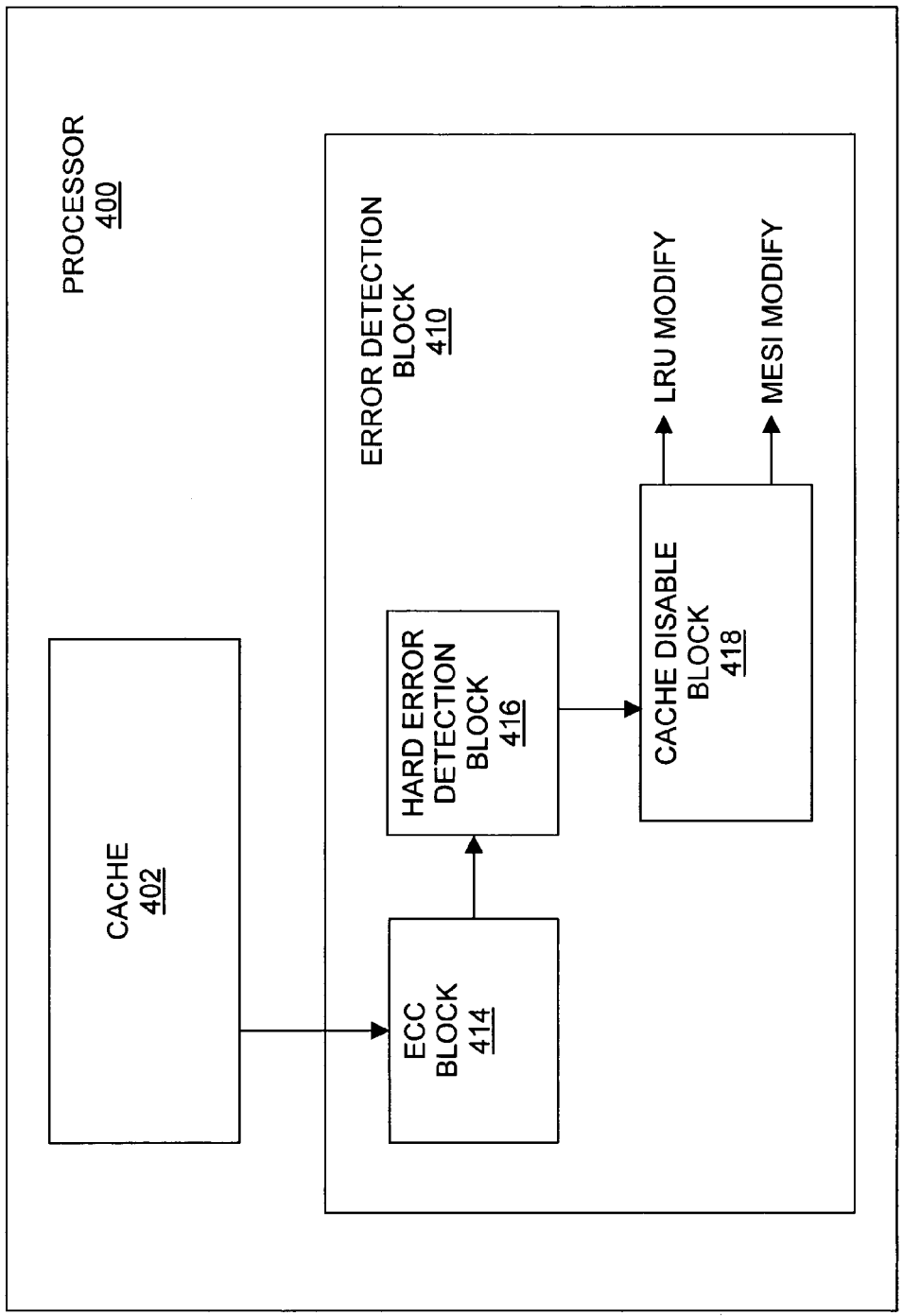
FIG. 4 is a block diagram illustrating a processor equipped with error correction logic in accordance with one embodiment of the present invention.

FIG. 4 is a block diagram illustrating a processor equipped with error correction logic in accordance with one embodiment of the present invention. As shown, processor 400 includes cache memory 402 and error detection block 410. In one embodiment, cache memory 402 may represent an n-way set associative static random access memory (SRAM) array. Error detection block 410 may include ECC block 414, hard error detect block 416, and cache disable block 418. ECC block 414 may represent error checking and correcting circuitry well-known in the art to facilitate detection of soft errors occurring in cache memory (such as cache memory 402). Since the operation and configuration of ECC block 414 is well known, it will not be discussed further except with respect to hard error detect block 416 and cache disable block 418.

Hard error detect block 416 represents logic/circuitry designed to detect and isolate hard errors caused by latent manufacturing defects within cache memory 402. In one embodiment, hard error detect block 416 may include digital logic and/or analog circuitry to determine if two consecutive soft errors occur within the same area of cache memory 402. In one embodiment, an error register is used to store data identifying a set/way area of cache memory 402 affected by an error as reported e.g. by ECC block 414.

Cache disable block 418 represents logic/circuitry designed to prevent an area of cache memory 402 affected by an error from being accessed any further by processor 400. In one embodiment, cache disable block 418 may disable or otherwise inhibit further access to a cacheline associated with an ECC error. In one embodiment, access to the affected cacheline may be inhibited via modification of a LRU score associated with the affected cacheline. Furthermore, access to the affected cacheline may be disabled via the assignment of an "invalid" state of a modified MESI protocol to the affected cacheline.

Figure 5:
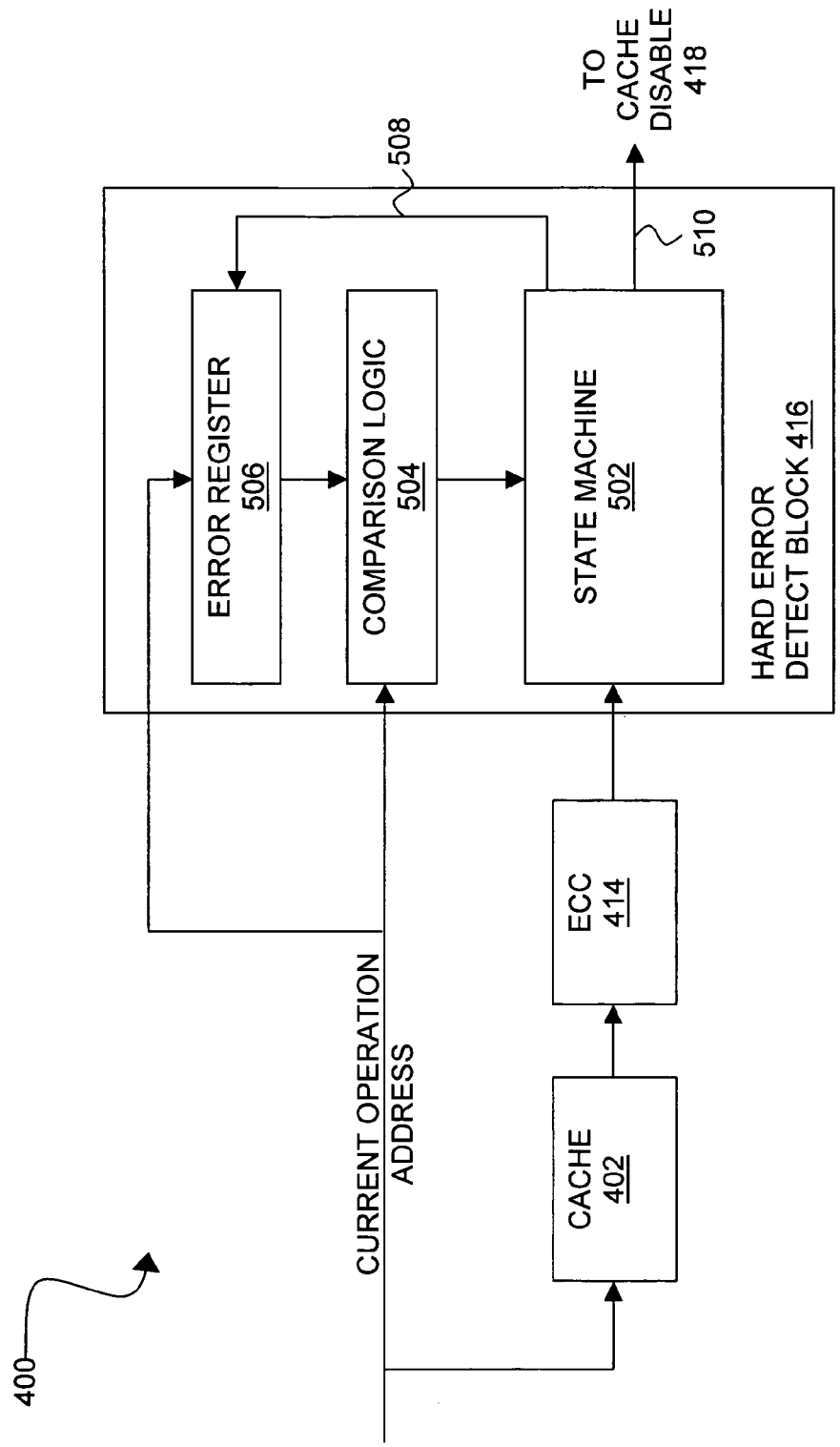
FIG. 5 is a block diagram illustrating one embodiment of the hard error detection logic of FIG. 4.

FIG. 5 is a block diagram illustrating one embodiment of hard error detection logic 416 of FIG. 4. As shown, hard error detection logic 416 includes error register 506 to store data identifying a particular area of cache memory 402 affected by an error (e.g. as reported by ECC block 414), comparison logic 504 to determine whether the data stored in error register 506 matches a current operation address, and state machine 502 to determine whether a detected error represents a second consecutive error associated with a common memory location such as a memory address.

During run-time, a current operation address may be provided by processor 400 to cache 402 and comparison logic 504. If an error is detected in an area of cache memory 402 where the current operation address is stored, ECC block 414 provides an error signal to state machine 502 reporting such error. At substantially the same time, the current operation address is compared via comparison logic 504 to an address stored in error register 506 and corresponding to a previous error. If the current operation address does not match the address stored in error register 506, write enable signal 508 may be asserted to store the current operation address in error register 506. However, if the current operation address does match the address stored in error register 506, a cache disable signal 510 coupled to cache disable block 418 may be asserted.

Figure 6:
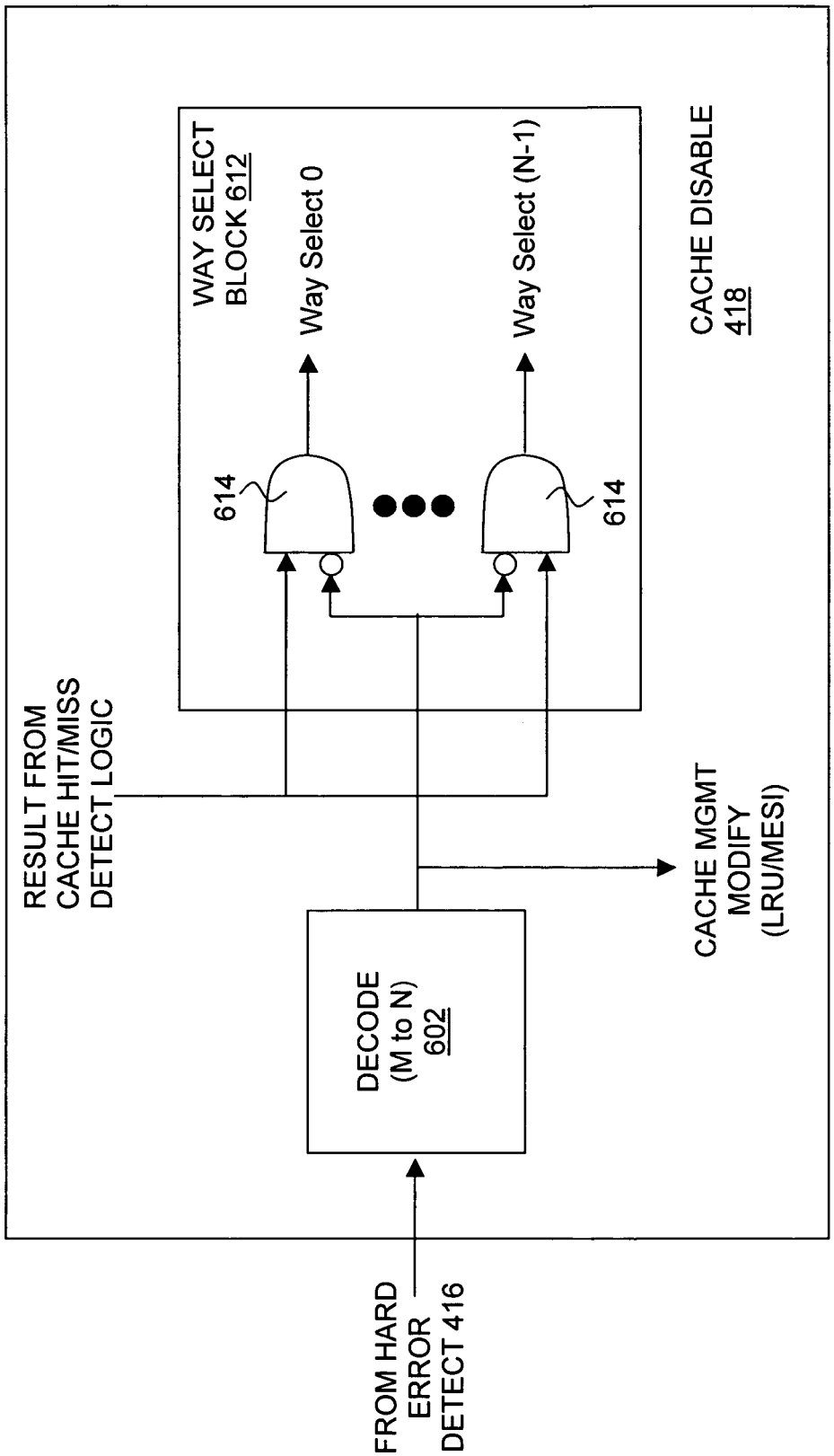
FIG. 6 is a block diagram illustrating one embodiment of the cache disable logic of FIG. 4.

FIG. 6 is a block diagram illustrating one embodiment of the cache disable logic of FIG. 4. As shown, cache disable logic 418 includes M-to-N decode logic 602 and way select logic 612. In one embodiment, M-to-N decode logic 602 generates a way disable vector based upon received cache disable signal 510. The way disable vector may be used to select any of (N-1) ways (e.g. via way select lines) as well as modifying a cache management system, such as a LRU score or MESI state assignment associated with the selected way. In one embodiment, the state of each way select line is determined based upon the outcome of a corresponding logical AND operation (e.g. via AND gate 614) performed between an inverted input signal and a non-inverted input signal for each way select line. In one embodiment, the non-inverted input signal corresponds to the result of a comparison between a cache tag array and the current operation address (e.g. via cache hit/miss detect logic—not shown), while the inverted input signal is derived from a corresponding out put signal from decode block 602.

In the embodiment of FIG. 6, AND gates 614 are each illustrated as having an inverted input signal as output signals from decode logic 602 is assumed to be active low. However, other circuit arrangements may be implemented without departing from the spirit and scope of the present invention as e.g. described with respect to the various illustrated embodiments. For example, if the output of decode logic is active high, AND gates 614 may not have an inverted input. In one embodiment, decode block 602 represents a 3-to-8 decoder to facilitate selection and subsequent disabling of any cacheline of an 8-way set associative cache memory.

Figure 7:
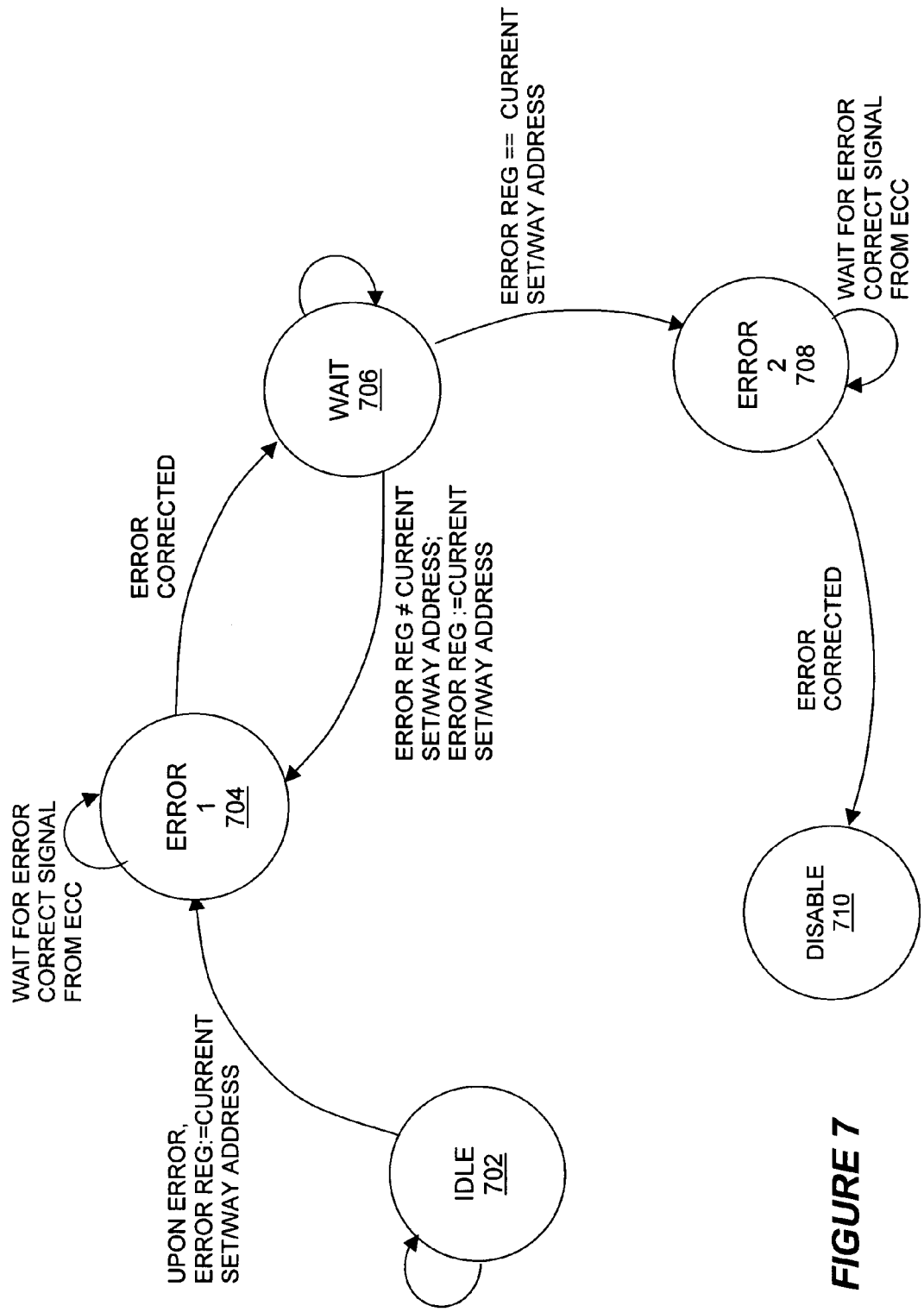
FIG. 7 illustrates an example state diagram that may be implemented via state machine 502 of FIG. 5, in accordance with one embodiment of the present invention.

FIG. 7 illustrates an example state diagram that may be implemented via state machine 502 of FIG. 5, in accordance with one embodiment of the present invention. As shown, the state machine 502 remains idle at state 702 until a first ECC error is detected via a signal from ECC block 414. Upon such time, state machine 502 progresses to state 704 while error register 506 is assigned the value of the current operation address such as e.g. the current set/way address. At state 704, state machine 502 may pause to allow ECC block 414 enough time to recover (as part of routine ECC operation) any modified data that may be stored in the affected area of the cache. In one embodiment state machine 502 may wait to receive an error correct signal from ECC block 414 indicating that the data has been successfully recovered and the error corrected. Upon the error being corrected, state machine 502 may proceed to state 706 where again it waits for another error to be detected. Upon receiving a second error, a determination may be made as to whether the set/way address stored in error register 506 is equal to the current address of the error. If not, the error register is assigned the value of the current set/way address and state machine 502 proceeds back to state 704. However, if the set/way address stored in error register 506 is equal to the current address of the error, state machine 502 proceeds to state 708 where state machine 502 again may wait for an error correct signal from ECC block 414. Once the error has been corrected and any modified data recovered by ECC block 414, state machine 502 proceeds to state 710 where the affected area of the cache as e.g. indicated by the stored set/way address is disabled.

Figure 8:
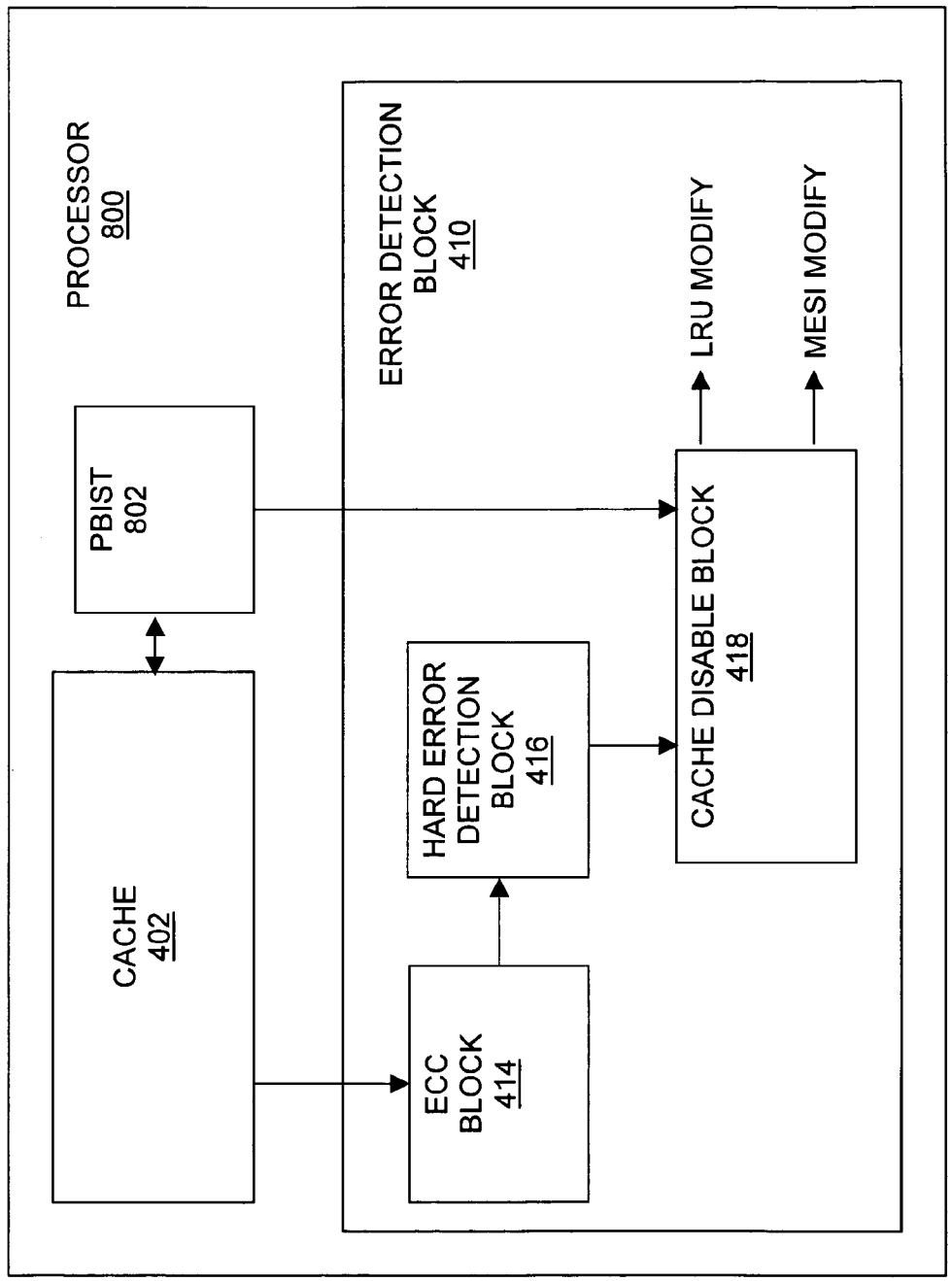
FIG. 8 is a block diagram illustrating a processor equipped with error correction logic in accordance with an alternative embodiment of the present invention.

FIG. 8 is a block diagram illustrating a processor equipped with error correction logic in accordance with an alternative embodiment of the present invention. Processor 800 is similar to processor 400 of FIG. 4 with the exception of PBIST block 802. PBIST block 802 represents programmable built-in self test logic/circuitry used to detect errors processor 800, and more specifically in cache 402, as processor 800 proceeds through a startup phase. Upon detecting an error in cache 402, PBIST block 802 may assert a signal causing cache disable block 418 to disable an affected cacheline. Since errors detected by PBIST block 802 are likely hard errors, cache disable block 418 may proceed to disable the affected cacheline and correspondingly modify a cache management system without determining if the error is a second consecutive error associated with a common memory area/address.

Figure 9:
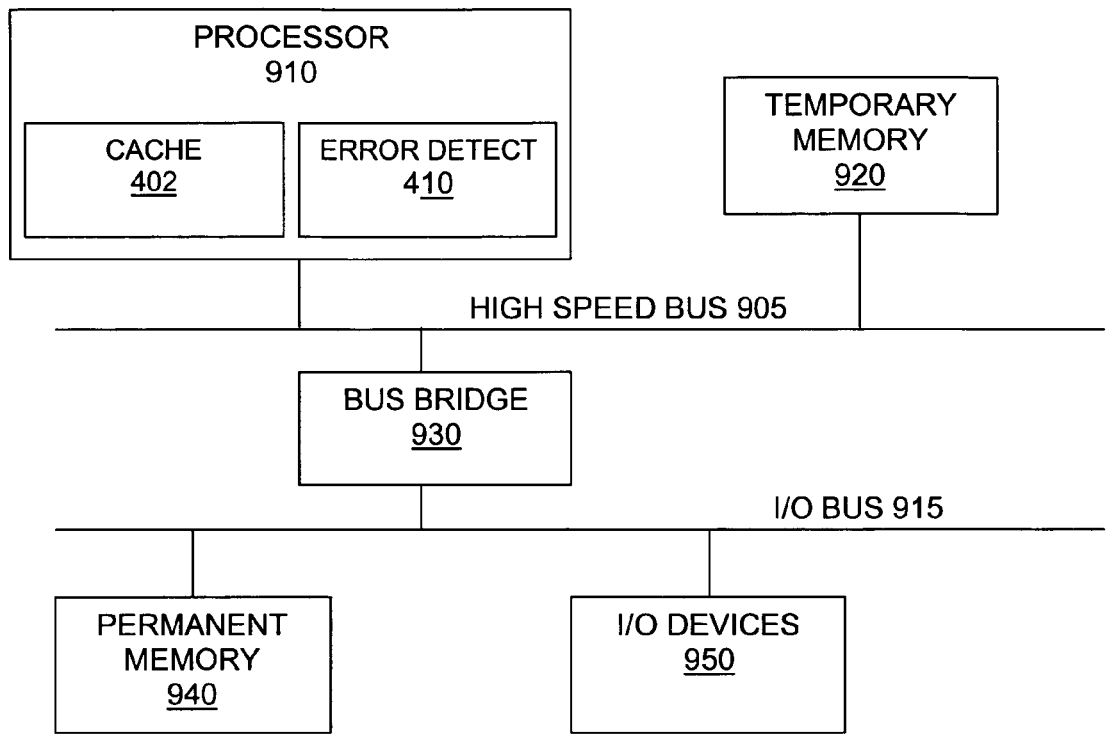
FIG. 9 illustrates one embodiment of a generic hardware system for use with various embodiments of the present invention.

FIG. 9 illustrates one embodiment of a generic hardware system intended to represent a broad category of computer systems such as personal computers, workstations, and/or embedded systems. In the illustrated embodiment, the hardware system includes processor 910 including cache 402 and error detect logic in accordance with embodiments of the invention. Processor 910 is coupled to high speed bus 905, which is coupled to input/output (I/O) bus 915 through bus bridge 930. Temporary memory 920 is coupled to bus 905. In various embodiments, temporary memory 920 may comprise dynamic ramdom access memory (DRAM). Permanent memory 940 is coupled to bus 915. I/O device(s) 950 is also coupled to bus 915. I/O device(s) 950 may include a display device, a keyboard, one or more external network interfaces, etc.

Certain embodiments may include additional components, may not require all of the above components, or may combine one or more components. For instance, cache 402 and/or error detect block 410 may be located off-chip with respect to processor 910. Alternately, permanent memory 940 may be eliminated and temporary memory 920 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Similarly, a variety of alternate internal networks could be used including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, could be implemented using one or more hardware systems such as the hardware system of FIG. 9. Where more than one computer is used, the systems can be coupled to communicate over an external network, such as a local area network (LAN), an internet protocol (IP) network, etc. In one embodiment, the present invention as described above may be implemented as software routines executed by one or more execution units within the computer(s). For a given computer, the software routines can be stored on a storage device, such as permanent memory 940.

Figure 10:
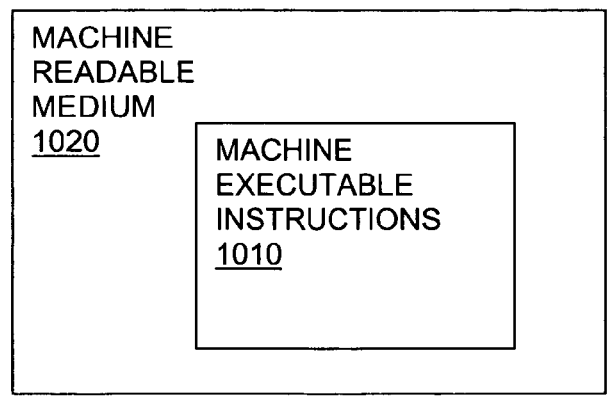
FIG. 10 illustrates one embodiment of a machine readable storage medium.

Alternately, as shown in FIG. 10, the software routines can be machine executable instructions 1010 stored using any machine readable storage medium 1020, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 950 of FIG. 9.

From whatever source, the instructions may be copied from the storage device into temporary memory 920 and then accessed and executed by processor 910. In one implementation, these software routines may be implemented in micro-control code. It is to be appreciated, however, that these routines may be implemented in any of a wide variety of programming languages.

In alternate embodiments, the present invention as described above may be implemented in discrete hardware or firmware. For example, one or more application specific integrated circuits (ASICs) could be programmed with one or more of the above described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

EPILOG

While the present invention has been described in terms of the above-illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method comprising:
   detecting an error within a cache line of a cache memory;
   determining whether the error is a second consecutive error associated with the cache line; and
   preventing further use of the cache line if the error is determined to be the second consecutive error associated with the cache line by modifying a cache management system to at least inhibit subsequent access to the cache line, said modifying including at least a selected one of modifying by the cache management system a value corresponding to a particular set such that the cache line is less likely to be accessed than at least one other cache line, and assigning by the cache management system a disable state to the cache line as part of a MESI state assignment.

2. The method of claim 1, wherein the cache memory comprises an n-way set associative static random access memory.

3. The method of claim 2, wherein the error comprises an error checking and correcting (ECC) based error.

4. The method of claim 1, further comprising:
   comparing a current operation address corresponding to the error with a stored address corresponding to a previous error; and
   identifying the error as the second consecutive error if the current operation address matches the stored address.

5. The method of claim 4, further comprising:
   storing the current operation address corresponding to the error in place of the stored address corresponding to the previous error if the current operation address does not match the stored address.

6. The method of claim 5, further comprising:
   accessing the current operation address corresponding to the error a second time to determine whether the second consecutive error occurs.

7. The method of claim 1, further comprising:
   determining whether data stored in the cache line of the cache memory has been modified as compared to data stored in a corresponding area of main memory;
   facilitating recovery of the modified data stored in the area of the cache memory; and
   preventing further use of the cache line of the cache memory after the modified data stored in the cache line of cache memory has been recovered.

8. The method of claim 1, wherein the error is detected via programmable built-in self test (PBIST) logic.

9. A processor comprising:
   a cache memory;
   error detection logic coupled to the cache memory, the error detection logic equipped to:
      detect an error within a cache line of the cache memory;
      determine whether the error is a second consecutive error associated with the cache line; and
      prevent further use of the cache line if the error is determined to be the second consecutive error associated with the cache line by modifying a cache management system to at least inhibit subsequent access to the cache line, said modifying including at least a selected one of modifying by the cache management system a value corresponding to a particular set such that the cache line is less likely to be accessed than at least one other cache line, and assigning a disable state to the cache line as part of a MESI state assignment.

10. The processor of claim 9, wherein the cache memory comprises an n-way set associative static random access memory (SRAM).

11. The processor of claim 9, wherein the error detection logic comprises:
    error checking and correcting logic to detect an error within the cache memory;
    hard error detection logic to determine whether the detected error is a hard error; and
    cacheline disable logic to disable a cache line affected by the error if it is determined that the detected error is a hard error.

12. The processor of claim 11, wherein the hard error detection logic further comprises:
    an error register to store address information indicating at least the cache line affected by the error;
    comparison logic to compare stored address information with a current operating address; and
    state logic to determine whether the error is a second consecutive error based upon output from the comparison logic.

13. The processor of claim 12, wherein the cacheline disable logic further comprises:
    a decoder to generate a way-disable vector prevent further use of the cache line; and
    way-select logic to select the cache line to be disabled based upon the way-disable vector;
    wherein the way-disable vector operates to modify a cache management system including at least one of a least recently used (LRU) algorithm and a MESI protocol.

14. The processor of claim 9, further comprising programmable built-in self test (PBIST) logic coupled to the error detection logic to facilitate detection of the error during a startup routine of the processor.

15. A system comprising:
    a dynamic random access memory and;
    an integrated circuit coupled to the dynamic random access memory, the integrated circuit including a cache memory and error detection logic, wherein the error detection logic is equipped to:

detect an error within a cache line of the cache memory,
determine whether the error is a second consecutive error associated with the cache line, and
prevent further use of the cache line if the error is determined to be the second consecutive error associated with the cache line by modifying a cache management system to at least inhibit subsequent access to the cache line, said modifying including at least a selected one of modifying a value corresponding to a particular set such that the cache line is less likely to be accessed than at least one other cache line, and assigning a disable state to the cache line as part of a MESI state assignment.

16. The system of claim 15, wherein the integrated circuit further includes a central processing unit and at least one input/output module coupled to the central processor unit.

17. The system of claim 15, wherein the integrated circuit is a microprocessor.

* * * * *

UNITED STATES PATENT AND TRADEMARK OFFICE
CERTIFICATE OF CORRECTION

PATENT NO. : 7,197,670 B2  Page 1 of 1
APPLICATION NO. : 10/750562
DATED : March 27, 2007
INVENTOR(S) : Boatright et al.

It is certified that error appears in the above-identified patent and that said Letters Patent is hereby corrected as shown below:

Column 7
Lines 33-34, "...associated, with..." should read --...associated with...--.

Column 10
Lines 5-6, "...a central processing unit... the central processor unit..." should read --...a central processing unit... the central processing unit...--.

Signed and Sealed this

Fourteenth Day of October, 2008

JON W. DUDAS
*Director of the United States Patent and Trademark Office*